US012654773B2

(12) United States Patent　　　　　(10) Patent No.:　US 12,654,773 B2
Tatsumoto et al.　　　　　　　　　　(45) Date of Patent:　Jun. 16, 2026

(54) INFORMATION PROCESSING APPARATUS, PARKING ASSISTANCE METHOD, AND NON-TRANSITORY COMPUTER READABLE MEDIUM

(71) Applicant: TOYOTA JIDOSHA KABUSHIKI KAISHA, Toyota (JP)

(72) Inventors: Yuki Tatsumoto, Seto (JP); Josuke Yamane, Nagoya (JP); Hirotaka Nogami, Nisshin (JP); Kazuya Nishimura, Anjo (JP); Takumi Fukunaga, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/978,324

(22) Filed: Dec. 12, 2024

(65) Prior Publication Data

US 2025/0196922 A1　　Jun. 19, 2025

(30) Foreign Application Priority Data

Dec. 15, 2023　(JP) ................................. 2023-212420

(51) Int. Cl.
B62D 15/02 　　　(2006.01)
B60K 35/28 　　　(2024.01)
B60W 50/14 　　　(2020.01)

(52) U.S. Cl.
CPC ............ B62D 15/028 (2013.01); B60K 35/28 (2024.01); B60W 50/14 (2013.01); B60K

2360/16 (2024.01); *B60K 2360/779* (2024.01); *B60W 2050/146* (2013.01)

(58) Field of Classification Search
CPC .. B62D 15/028; B62D 15/0285; B60K 35/28; B60K 2360/16; B60K 2360/779; B60W 50/14; B60W 2050/146; G08G 1/168
See application file for complete search history.

(56) References Cited

U.S. PATENT DOCUMENTS

| | | | | |
|---|---|---|---|---|
| 2006/0287826 A1* | 12/2006 | Shimizu | ............. | G01C 21/3602 |
| | | | | 701/431 |
| 2010/0259420 A1* | 10/2010 | Von Reyher | ........... | G08G 1/165 |
| | | | | 701/1 |
| 2011/0006917 A1 | 1/2011 | Taniguchi et al. | | |
| 2023/0219621 A1* | 7/2023 | Kim | .................... | B62D 5/0481 |
| | | | | 701/41 |

FOREIGN PATENT DOCUMENTS

| | | | |
|---|---|---|---|
| DE | 102013016342 A1 | 4/2015 | |
| JP | 2002-166802 A | 6/2002 | |
| JP | 2007-118878 A | 5/2007 | |
| JP | 2014-058309 A | 4/2014 | |

* cited by examiner

*Primary Examiner* — Omeed Alizada
(74) *Attorney, Agent, or Firm* — Dinsmore & Shohl LLP

(57) ABSTRACT

An information processing apparatus includes a controller and a display. The controller is configured to detect a parking space in which a vehicle is to be parked, as a rectangular area having a longitudinal direction and a shortitudinal direction, and display, by the display on a rear view screen, guide information regarding an angular difference between the longitudinal direction of the rectangular area and a front and rear direction of the vehicle.

20 Claims, 5 Drawing Sheets

FIG. 4

- ANGULAR DIFFERENCE: DEVIATION OF $\theta$ DEGREES
- PLEASE TURN STEERING WHEEL TO LEFT.

INFORMATION PROCESSING APPARATUS, PARKING ASSISTANCE METHOD, AND NON-TRANSITORY COMPUTER READABLE MEDIUM

CROSS-REFERENCE TO RELATED APPLICATION

This application claims priority to Japanese Patent Application No. 2023-212420 filed on Dec. 15, 2023, the entire contents of which are incorporated herein by reference.

TECHNICAL FIELD

The present disclosure relates to an information processing apparatus, a parking assistance method, and a program.

BACKGROUND

Conventionally, parking assistance apparatuses that provide guidance to set target parking positions to assist vehicle parking operations are known. For example, see Patent Literature (PTL) 1.

CITATION LIST

Patent Literature

PTL 1: JP 2007-118878 A

SUMMARY

Parking spaces for automobiles are demarcated by white lines or the like on road surfaces, and are rectangular in shape with longitudinal directions corresponding to front and rear directions of the automobiles and shortitudinal directions corresponding to right and left directions of the automobiles. When a front and rear direction of a parked automobile is not approximately in parallel with a longitudinal direction of a parking space, the automobile may not fit within the parking space. To ensure that the automobile fits within the parking space, it is desirable to park the automobile so that the front and rear direction of the automobile and the longitudinal direction of the parking space are approximately in parallel with each other. Thus, there is room for improvement with respect to technology for assisting vehicle parking operations.

It would be helpful to improve technology for assisting vehicle parking operations.

An information processing apparatus according to an embodiment of the present disclosure includes:

a controller; and a display, wherein the controller is configured to:

detect a parking space in which a vehicle is to be parked, as a rectangular area having a longitudinal direction and a shortitudinal direction; and display, by the display on a rear view screen, guide information regarding an angular difference between the longitudinal direction of the rectangular area and a front and rear direction of the vehicle.

A parking assistance method according to an embodiment of the present disclosure is a parking assistance method performed by an information processing apparatus, the parking assistance method including:

detecting a parking space in which a vehicle is to be parked, as a rectangular area having a longitudinal direction and a shortitudinal direction; and displaying, on a rear view screen, guide information regarding an angular difference between the longitudinal direction of the rectangular area and a front and rear direction of the vehicle.

A program according to an embodiment of the present disclosure is configured to cause a computer to execute operations, the operations including:

detecting a parking space in which a vehicle is to be parked, as a rectangular area having a longitudinal direction and a shortitudinal direction; and displaying, on a rear view screen, guide information regarding an angular difference between the longitudinal direction of the rectangular area and a front and rear direction of the vehicle.

According to an embodiment of the present disclosure, technology for assisting vehicle parking operations is improved.

BRIEF DESCRIPTION OF THE DRAWINGS

In the accompanying drawings:

FIG. 4 is a diagram illustrating an example of a guide image; and

DETAILED DESCRIPTION

Hereinafter, an embodiment of the present disclosure will be described.

Outline of Embodiment

Figure 1:
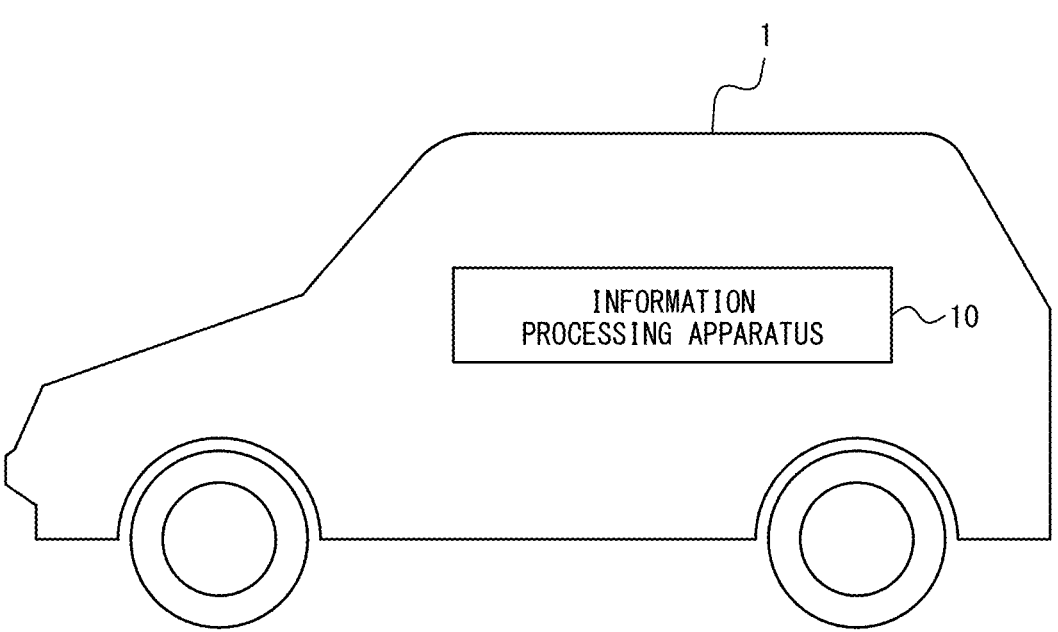
FIG. 1 is a block diagram illustrating a schematic configuration of a system according to an embodiment of the present disclosure.

An outline of technology according to the embodiment of the present disclosure will be described with reference to FIG. 1. The technology according to the embodiment of the present disclosure includes a vehicle 1 and an information processing apparatus 10 installed in the vehicle 1.

The vehicle 1 is an automobile, for example, but is not limited to this and may be any appropriate vehicle. The automobile is, for example, a gasoline vehicle, a battery electric vehicle (BEV), a hybrid electric vehicle (HEV), a plug-in hybrid electric vehicle (PHEV), a fuel cell electric vehicle (FCEV), or the like, but is not limited to these.

The information processing apparatus 10 is any apparatus used by an occupant of the vehicle 1. For example, a dedicated in-vehicle device can be employed as the information processing apparatus 10.

First, an outline of the present embodiment will be described, and details thereof will be described later. The information processing apparatus 10 detects a parking space in which the vehicle 1 is to be parked, as a rectangular area having a longitudinal direction and a shortitudinal direction. The information processing apparatus 10 also displays, on a rear view screen, guide information regarding an angular difference between the longitudinal direction of the rectangular area and a front and rear direction of the vehicle 1.

Thus, according to the present embodiment, the parking space in which the vehicle 1 is to be parked is detected as the rectangular area having the longitudinal direction and the shortitudinal direction, and the guide information regarding the angular difference between the longitudinal direction of the rectangular area and the front and rear direction of the vehicle 1 is presented. Therefore, the technology for assisting vehicle parking operations is improved in that the guide information to assist parking can be provided so that the front and rear direction of the vehicle 1 and the longitudinal direction of the parking space are approximately in parallel with each other.

Configuration of Information Processing Apparatus

Next, a configuration of the information processing apparatus 10 will be described in detail. The information processing apparatus 10 is any apparatus used by a user.

Figure 2:
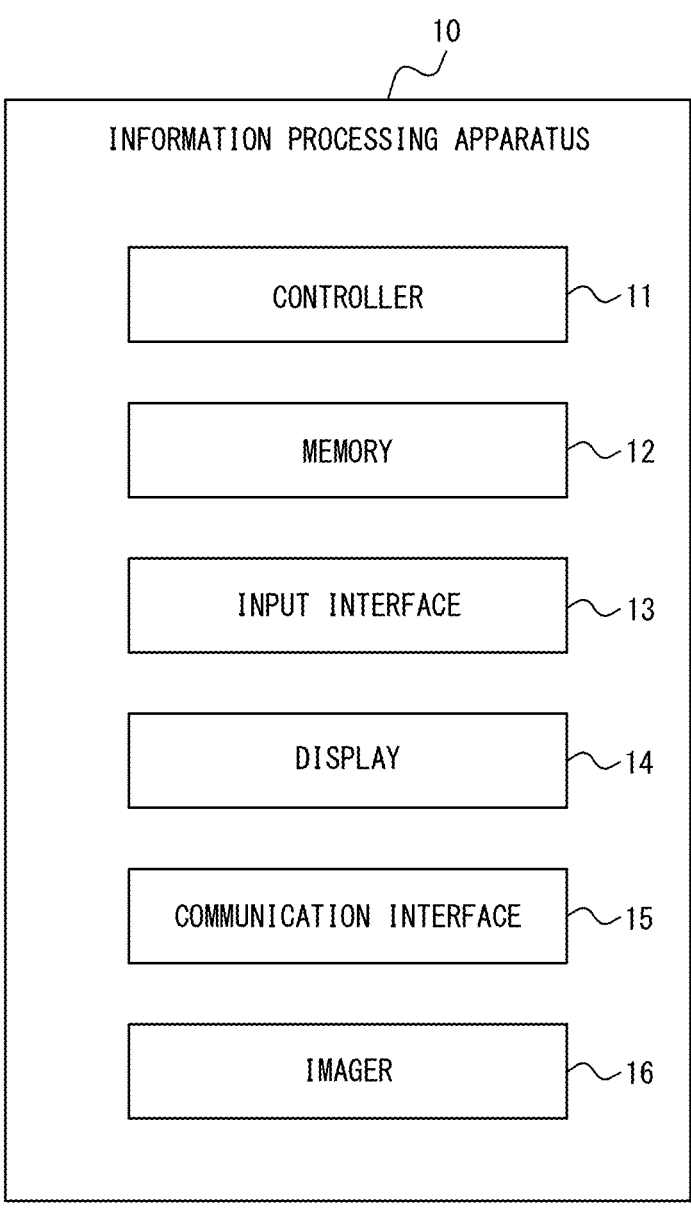
FIG. 2 is a block diagram illustrating a schematic configuration of an information processing apparatus.

As illustrated in FIG. 2, the information processing apparatus 10 includes a controller 11, a memory 12, an input interface 13, a display 14, a communication interface 15, and an imager 16.

The controller 11 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 11 executes processes related to operations of the information processing apparatus 10 while controlling components of the information processing apparatus 10.

The memory 12 includes at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 12 functions as, for example, a main memory, an auxiliary memory, or a cache memory. The memory 12 stores data to be used in the operations of the information processing apparatus 10 and data obtained by the operations of the information processing apparatus 10.

The input interface 13 includes at least one interface for input. The interface for input is, for example, a physical key, a capacitive key, a pointing device, or a touch screen integrally provided with a display. The interface for input may be, for example, an audio sensor that accepts audio input, a camera that accepts gesture input, or the like. The input interface 13 accepts an operation for inputting data to be used for the operations of the information processing apparatus 10. The input interface 13 may be connected to the information processing apparatus 10 as an external input device, instead of being included in the information processing apparatus 10. As a connection method, for example, any method such as Universal Serial Bus (USB), High-Definition Multimedia Interface (HDMI®) (HDMI is a registered trademark in Japan, other countries, or both), or Bluetooth® (Bluetooth is a registered trademark in Japan, other countries, or both) can be used.

The display 14 includes at least one interface for display output. The interface for display output is, for example, a display that displays a rear view and the like. The rear view is image information illustrating an exterior view of the rear of the vehicle 1. The display is, for example, a liquid crystal display (LCD) or an organic electro luminescent (EL) display. The display 14 displays and outputs data obtained by the operations of the information processing apparatus 10. The display 14 may be connected to the information processing apparatus 10 as an external output device, instead of being included in the information processing apparatus 10. As a connection method, any method such as USB, HDMI®, or Bluetooth® can be used.

The communication interface 15 includes a communication interface for connection to a network. The communication interface 15 may include a communication interface for connection to CAN. The communication interface for connection to the network is compliant with mobile communication standards or the like, but is not limited to these and may be compliant with any communication standard. In the present embodiment, the information processing apparatus 10 that one mobile object has is wirelessly connected to the information processing apparatus that another mobile object has, via the communication interface 15 and the network. The communication interface 15 receives data to be used in the operations of the information processing apparatus 10, and transmits data obtained by the operations of the information processing apparatus 10.

The imager 16 includes an in-vehicle camera that generates images of the exterior view of the rear of the vehicle 1. In the present embodiment, the images may be still images or moving images. The in-vehicle camera included in the imager 16 may be a monocular camera or a stereo camera. The imager 16 is installed in the vehicle 1 so that the imager 16 can image the exterior view of the rear of the vehicle 1. Since the imager 16 images the exterior view of the rear of the vehicle 1, the aforementioned rear view can be displayed on the display 14.

The functions of the information processing apparatus 10 may be implemented by a processor, which corresponds to the information processing apparatus 10, executing a program according to the present embodiment. That is, the functions of the information processing apparatus 10 are realized by software. The program causes a computer to execute the operations of the information processing apparatus 10, thereby causing the computer to function as the information processing apparatus 10. That is, the computer executes the operations of the information processing apparatus 10 in accordance with the program to thereby function as the information processing apparatus 10.

In the present embodiment, the program can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a digital versatile disc (DVD) or a compact disc read only memory (CD-ROM) on which the program is recorded. The program may also be distributed by storing the program in a storage of an external server and transmitting the program from the external server to another computer. The program may be provided as a program product.

Some or all of the functions of the information processing apparatus 10 may be realized by a dedicated circuit corresponding to the controller 11. That is, some or all of the functions of the information processing apparatus 10 may be realized by hardware.

Operations of Information Processing Apparatus

Figure 3:
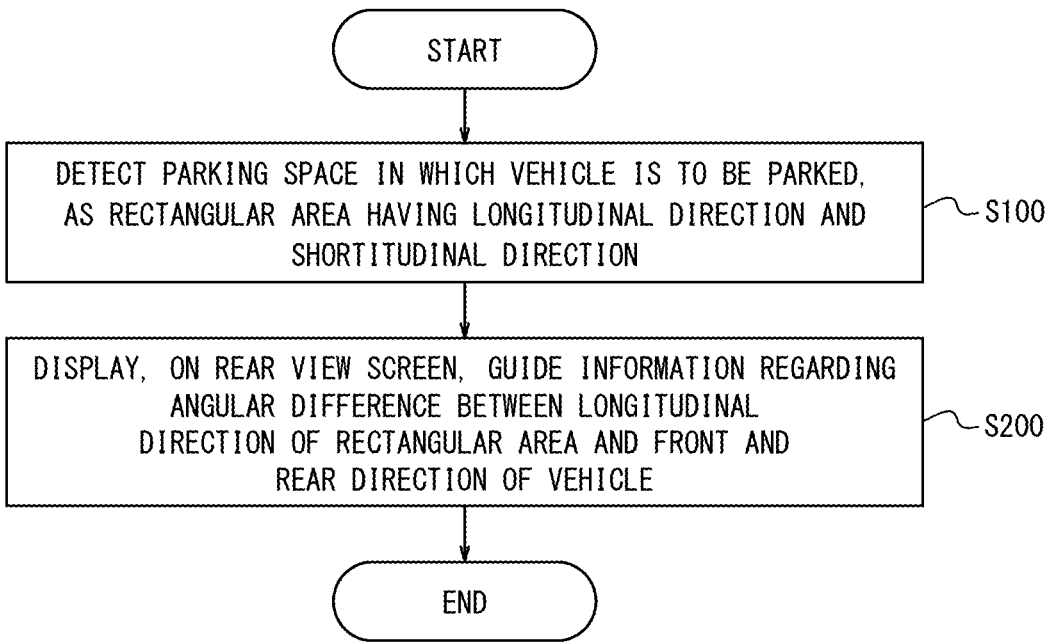
FIG. 3 is a flowchart illustrating operations of the information processing apparatus.

The operations of the information processing apparatus 10 according to the present embodiment will be described with reference to FIG. 3.

Step S100: The controller 11 of the information processing apparatus 10 detects a parking space in which the vehicle 1 is to be parked, as a rectangular area having a longitudinal direction and a shortitudinal direction. Any appropriate method can be employed to detect the parking space. For example, parking space detection processing may be performed by image recognition of rear images captured by the imager 16.

Step S200: The controller 11 displays, by the display 14 on a rear view screen, guide information regarding an angular difference between the longitudinal direction of the rectangular area and the front and rear direction of the vehicle 1.

Figure 4:
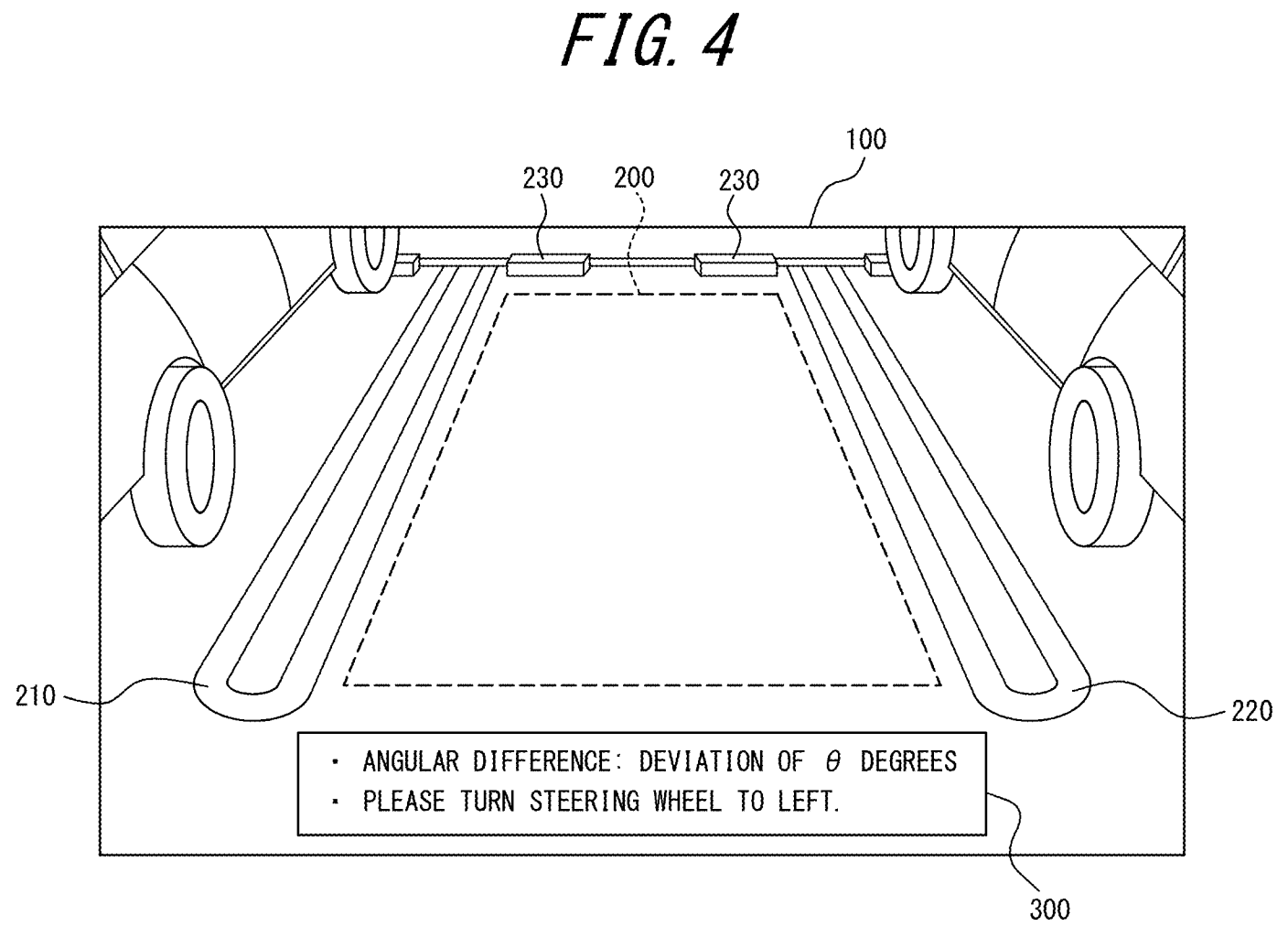

FIG. 4 is an example of a user interface 100 that includes a guide image. The user interface 100 includes a rectangular area 200 indicating a parking space and guide information 300. The rectangular area 200 is detected based on a white line 210, a white line 220, and parking blocks 230. As described above, the guide information 300 includes information regarding an angular difference between a longitudinal direction of the rectangular area 200 and the front and rear direction of the vehicle 1. In FIG. 4, the guide information 300 includes that such an angular difference is θ degrees.

Figure 5:
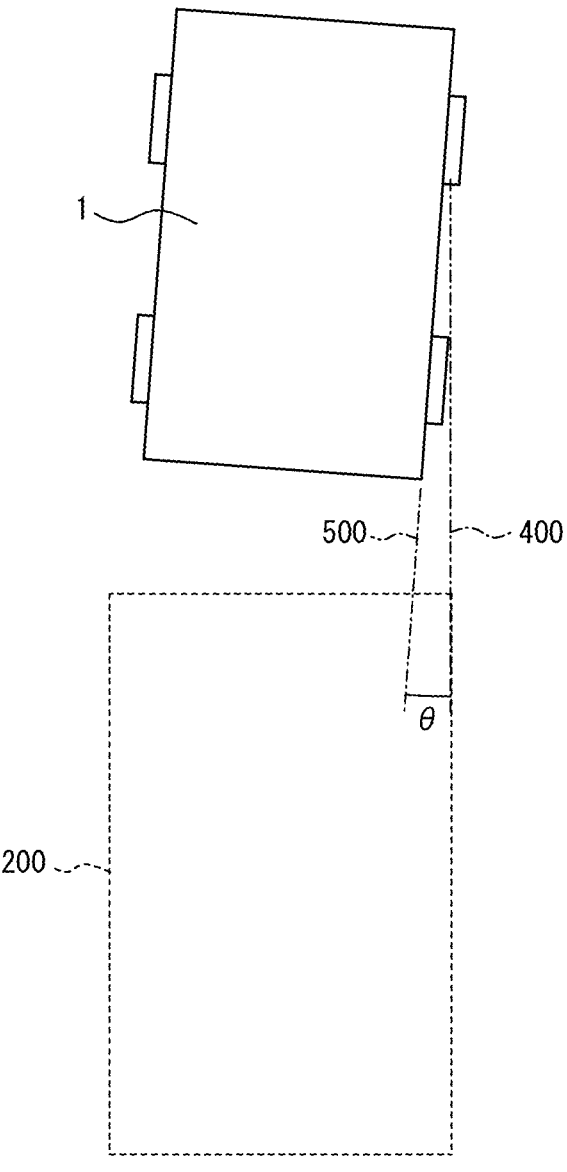
FIG. 5 is a diagram illustrating an angular difference between a longitudinal direction of a rectangular area and a front and rear direction of a vehicle.

FIG. 5 is a conceptual diagram illustrating the angular difference between the longitudinal direction of the rectangular area 200 and the front and rear direction of the vehicle 1. As illustrated in FIG. 5, such an angular difference is a value determined based on an angle between the longitudinal direction of the rectangular area 200 and the front and rear direction of the vehicle 1. Specifically, the angular difference is an angle θ formed between an auxiliary line 400 in the longitudinal direction of the rectangular area 200 and an auxiliary line 500 in the front and rear direction of the vehicle 1.

The guide information 300 may include driving assistance information indicating a driving operation that brings the angular difference close to zero. For example, the guide information 300 in FIG. 4 includes, as such driving assistance information, the direction of a steering operation. Specifically, the guide information 300 in FIG. 4 includes the driving assistance information such as "Please turn steering wheel to left". This allows a driver to easily drive the vehicle 1 so as to bring the angular difference close to zero. The driving assistance information may also include the amount of the steering operation. For example, the driving assistance information may include, as the amount of the steering operation, information on an angle at which the steering wheel is turned.

As described above, the information processing apparatus 10 according to the present embodiment detects the parking space in which the vehicle 1 is to be parked, as the rectangular area 200 having the longitudinal direction and the shortitudinal direction, and presents the guide information 300 regarding the angular difference between the longitudinal direction of the rectangular area 200 and the front and rear direction of the vehicle 1. Therefore, the technology for assisting vehicle parking operations is improved in that the guide information 300 to assist parking can be provided so that the front and rear direction of the vehicle 1 and the longitudinal direction of the parking space are approximately in parallel with each other.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or a single component, step, or the like can be divided.

For example, the controller 11 may predict a travel route in parking and, upon determining that a turnaround operation is necessary, notify the driver that the turnaround operation is necessary.

For example, the controller 11 may store an actual travel track in parking and an ideal travel track, and display, by the display 14, the actual travel track and the ideal travel track in a later comparable manner.

The guide information 300 may also include information regarding a difference between the center of the rectangular area 200 and the center of the vehicle 1. This can assist the driver in a parking operation such that the vehicle 1 fits in the center of the rectangular area 200.

Examples of some embodiments of the present disclosure are described below. However, it should be noted that the embodiments of the present disclosure are not limited to these examples.

[Appendix 1] An information processing apparatus comprising:

a controller; and a display, wherein the controller is configured to:

detect a parking space in which a vehicle is to be parked, as a rectangular area having a longitudinal direction and a shortitudinal direction; and display, by the display on a rear view screen, guide information regarding an angular difference between the longitudinal direction of the rectangular area and a front and rear direction of the vehicle.

[Appendix 2] The information processing apparatus according to appendix 1, wherein the controller is configured to display, by the display, driving assistance information indicating a driving operation that brings the angular difference close to zero.

[Appendix 3] The information processing apparatus according to appendix 2, wherein the driving assistance information includes a direction of a steering operation that brings the angular difference close to zero.

[Appendix 4] The information processing apparatus according to appendix 2 or 3, wherein the driving assistance information includes an amount of a steering operation that brings the angular difference close to zero.

[Appendix 5] The information processing apparatus according to any one of appendices 1 to 4, wherein the controller is configured to predict a travel route in parking, and, upon determining that a turnaround operation is necessary, notify a driver that the turnaround operation is necessary.

[Appendix 6] The information processing apparatus according to any one of appendices 1 to 5, wherein the controller is configured to store an actual travel track in parking and an ideal travel track, and display, by the display, the actual travel track and the ideal travel track in a later comparable manner.

[Appendix 7] The information processing apparatus according to any one of appendices 1 to 6, wherein the guide information includes information regarding a difference between a center of the rectangular area and a center of the vehicle.

[Appendix 8] A parking assistance method performed by an information processing apparatus, the parking assistance method comprising:

detecting a parking space in which a vehicle is to be parked, as a rectangular area having a longitudinal direction and a shortitudinal direction; and displaying, on a rear view screen, guide information regarding an angular difference between the longitudinal direction of the rectangular area and a front and rear direction of the vehicle.

[Appendix 9] The parking assistance method according to appendix 8, further comprising displaying driving assistance information indicating a driving operation that brings the angular difference close to zero.

[Appendix 10] The parking assistance method according to appendix 9, wherein the driving assistance information includes a direction of a steering operation that brings the angular difference close to zero.

[Appendix 11] The parking assistance method according to appendix 9 or 10, wherein the driving assistance information includes an amount of a steering operation that brings the angular difference close to zero.

[Appendix 12] The parking assistance method according to any one of appendices 8 to 11, further comprising predicting a travel route in parking, and, upon determining that a turnaround operation is necessary, notifying a driver that the turnaround operation is necessary.

[Appendix 13] The parking assistance method according to any one of appendices 8 to 12, further comprising storing an actual travel track in parking and an ideal travel track, and displaying the actual travel track and the ideal travel track in a later comparable manner.

[Appendix 14] The parking assistance method according to any one of appendices 8 to 13, wherein the guide information includes information regarding a difference between a center of the rectangular area and a center of the vehicle.

[Appendix 15] A program configured to cause a computer to execute operations, the operations comprising:

detecting a parking space in which a vehicle is to be parked, as a rectangular area having a longitudinal direction and a shortitudinal direction; and displaying, on a rear view screen, guide information regarding an angular difference between the longitudinal direction of the rectangular area and a front and rear direction of the vehicle.

[Appendix 16] The program according to appendix 15, wherein the operations further comprise displaying driving assistance information indicating a driving operation that brings the angular difference close to zero.

[Appendix 17] The program according to appendix 16, wherein the driving assistance information includes a direction of a steering operation that brings the angular difference close to zero.

[Appendix 18] The program according to appendix 16 or 17, wherein the driving assistance information includes an amount of a steering operation that brings the angular difference close to zero.

[Appendix 19] The program according to any one of appendices 15 to 18, wherein the operations further comprise predicting a travel route in parking, and, upon determining that a turnaround operation is necessary, notifying a driver that the turnaround operation is necessary.

[Appendix 20] The program according to any one of appendices 15 to 19, wherein the operations further comprise storing an actual travel track in parking and an ideal travel track, and displaying the actual travel track and the ideal travel track in a later comparable manner.

The invention claimed is:

1. An information processing apparatus comprising:
a controller; and
a display,
wherein the controller is configured to:
detect a parking space in which a vehicle is to be parked, as a rectangular area having a longitudinal direction and a latitudinal direction;
display, by the display, a rear image on a rear view screen; and
display, by the display, a guide image having guide information onto the rear image, the guide information including information indicating a value of an angular difference which is an angle formed between a first auxiliary line in the longitudinal direction of the rectangular area and a second auxiliary line in a front and rear direction of the vehicle.

2. The information processing apparatus according to claim 1, wherein the controller is configured to display, by the display, driving assistance information indicating a driving operation that brings the angular difference close to zero.

3. The information processing apparatus according to claim 2, wherein the driving assistance information includes a direction of a steering operation that brings the angular difference close to zero.

4. The information processing apparatus according to claim 3, wherein the driving assistance information includes an amount of the steering operation that brings the angular difference close to zero.

5. The information processing apparatus according to claim 1, wherein the controller is configured to predict a travel route in parking, and, upon determining that a turnaround operation is necessary, notify a driver that the turnaround operation is necessary.

6. The information processing apparatus according to claim 1, wherein the controller is configured to store an actual travel track in parking and an ideal travel track, and display, by the display, the actual travel track and the ideal travel track in a later comparable manner.

7. The information processing apparatus according to claim 1, wherein the guide information includes information regarding a difference between a center of the rectangular area and a center of the vehicle.

8. A parking assistance method performed by an information processing apparatus, the parking assistance method comprising:

detecting a parking space in which a vehicle is to be parked, as a rectangular area having a longitudinal direction and a latitudinal direction;

displaying a rear image on a rear view screen; and displaying a guide image having guide information onto the rear image, the guide information including information indicating a value of an angular difference which is an angle formed between a first auxiliary line in the longitudinal direction of the rectangular area and a second auxiliary line in a front and rear direction of the vehicle.

9. The parking assistance method according to claim 8, further comprising displaying driving assistance information indicating a driving operation that brings the angular difference close to zero.

10. The parking assistance method according to claim 9, wherein the driving assistance information includes a direction of a steering operation that brings the angular difference close to zero.

11. The parking assistance method according to claim 10, wherein the driving assistance information includes an amount of the steering operation that brings the angular difference close to zero.

12. The parking assistance method according to claim 8, further comprising predicting a travel route in parking, and, upon determining that a turnaround operation is necessary, notifying a driver that the turnaround operation is necessary.

13. The parking assistance method according to claim 8, further comprising storing an actual travel track in parking and an ideal travel track, and displaying the actual travel track and the ideal travel track in a later comparable manner.

14. The parking assistance method according to claim 8, wherein the guide information includes information regarding a difference between a center of the rectangular area and a center of the vehicle.

15. A non-transitory computer readable medium storing a program configured to cause a computer to execute operations, the operations comprising:

detecting a parking space in which a vehicle is to be parked, as a rectangular area having a longitudinal direction and a latitudinal direction;

displaying a rear image on a rear view screen; and displaying a guide image having guide information onto the rear image, the guide information including information indicating a value of an angular difference which is an angle formed between a first auxiliary line in the longitudinal direction of the rectangular area and a second auxiliary line in a front and rear direction of the vehicle.

16. The non-transitory computer readable medium according to claim 15, wherein the operations further comprise displaying driving assistance information indicating a driving operation that brings the angular difference close to zero.

17. The non-transitory computer readable medium according to claim 16, wherein the driving assistance information includes a direction of a steering operation that brings the angular difference close to zero.

18. The non-transitory computer readable medium according to claim 17, wherein the driving assistance information includes an amount of the steering operation that brings the angular difference close to zero.

19. The non-transitory computer readable medium according to claim 15, wherein the operations further comprise predicting a travel route in parking, and, upon determining that a turnaround operation is necessary, notifying a driver that the turnaround operation is necessary.

20. The non-transitory computer readable medium according to claim 15, wherein the operations further comprise storing an actual travel track in parking and an ideal travel track, and displaying the actual travel track and the ideal travel track in a later comparable manner.

* * * * *